United States Patent
Deshpande et al.

(10) Patent No.: US 8,482,677 B2
(45) Date of Patent: Jul. 9, 2013

(54) TELEVISION WITH COUPLED ELECTRICAL POWER

(75) Inventors: Sachin G. Deshpande, Camas, WA (US); Louis Joseph Kerofsky, Camas, WA (US); M. Ibrahim Sezan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 128 days.

(21) Appl. No.: 13/010,127

(22) Filed: Jan. 20, 2011

(65) Prior Publication Data

US 2012/0188463 A1    Jul. 26, 2012

(51) Int. Cl.
*H04N 5/63*     (2006.01)
*G06F 3/038*    (2006.01)
*G09G 5/00*     (2006.01)

(52) U.S. Cl.
USPC ........... 348/730; 348/552; 345/211; 345/212; 345/102; 320/111

(58) Field of Classification Search
USPC ............... 348/730, 552; 345/204, 211, 87, 345/102, 212; 320/132, 136, 111
See application file for complete search history.

(56) References Cited

U.S. PATENT DOCUMENTS

| | | | |
|---|---|---|---|
| 3,931,636 A | 1/1976 | Schneider | |
| 6,005,236 A * | 12/1999 | Phelan et al. | 250/203.4 |
| 6,618,042 B1 * | 9/2003 | Powell | 345/204 |
| 7,095,212 B2 * | 8/2006 | Sudo et al. | 320/136 |
| 2003/0001815 A1 | 1/2003 | Cui | |
| 2004/0130556 A1 | 7/2004 | Nokiyama | |
| 2004/0198468 A1 | 10/2004 | Patel et al. | |
| 2006/0043792 A1 * | 3/2006 | Hjort et al. | 307/1 |
| 2006/0119742 A1 * | 6/2006 | Park | 348/730 |
| 2011/0001485 A1 * | 1/2011 | Feight et al. | 324/500 |

FOREIGN PATENT DOCUMENTS

| | | |
|---|---|---|
| JP | 03-081810 A | 4/1991 |
| JP | 07-141075 A | 6/1995 |
| JP | 08-095681 A | 4/1996 |
| JP | 11-143591 A | 5/1999 |

(Continued)

OTHER PUBLICATIONS

International Search Report, mailed Mar. 6, 2012 for PCT International App. No. PCT/JP2012/051580 by Sharp Kabushiki Kaisha, 7 pgs.

*Primary Examiner* — Michael Lee
(74) *Attorney, Agent, or Firm* — Chernoff Vilhauer McClung & Stenzel, LLP

(57) ABSTRACT

A display device includes power management by including a first input suitable to receive electrical power from an outlet for providing power for the operation of the display device. The display device includes a second input, separate from the first input, suitable to receive electrical power from an external battery source for providing power for the operation of the display device. The display device includes an internal battery source enclosed within the display device suitable for providing power for the operation of the display device. A source select is enclosed within the display device that selects power from at least one of the first input, the second input, and the internal battery for providing power for the operation of the display device. A processor receives video content from a video source and selectively modifies a backlight of the display device based upon the power source selected by the source select in such a manner as to reduce the power consumption of the display device. The processor may additionally change the media playback behavior to decode and playback only some of the video frames to reduce the power consumption of decoder and display device.

23 Claims, 5 Drawing Sheets

FOREIGN PATENT DOCUMENTS

| | | |
|---|---|---|
| JP | 2000-032669 | 1/2000 |
| JP | 2000-312106 A | 11/2000 |
| JP | 2001-119664 A | 4/2001 |
| JP | 2005-295683 A | 10/2005 |
| JP | 2008-311712 A | 12/2008 |
| JP | 2010-282833 A | 12/2010 |
| WO | 2006126126 A1 | 11/2006 |

* cited by examiner

TELEVISION WITH COUPLED ELECTRICAL POWER

CROSS-REFERENCE TO RELATED APPLICATIONS

Not applicable.

BACKGROUND OF THE INVENTION

The present invention relates generally to a television with coupled electrical power.

A television is a commonly used device for receiving and displaying video content. The audio-video content is typically in the form of an encoded communication over a broadcast channel, such as over the air, a cable connection, or other data connection. The video content is displayed on the display and the audio content is provided through associated speakers.

A television typically includes a power cord that is plugged into the outlet in the room where the television is located. With the power being provided from the outlet, which has power provided by the utility grid, the television will receive signals and display video. When the power to the outlet is interrupted, such as during a winter storm, the television will turn off and no longer receive signals and display video. When the power is no longer interrupted, the television may be turned back on to resume receiving signals and displaying video.

Some televisions include an internal battery together with a power cord that is plugged into the outlet in the room where the television is located. With the power being provided from the outlet or the internal battery, the television will receive signals and display video. When the power to the outlet is interrupted and the internal battery is low on power, such as during a winter storm, the television will turn off and no longer receive signals and display video. When the power is no longer interrupted or the battery is not low on power, the television may be turned back on to resume receiving signals and displaying video.

What is desired is a television with effective power management.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
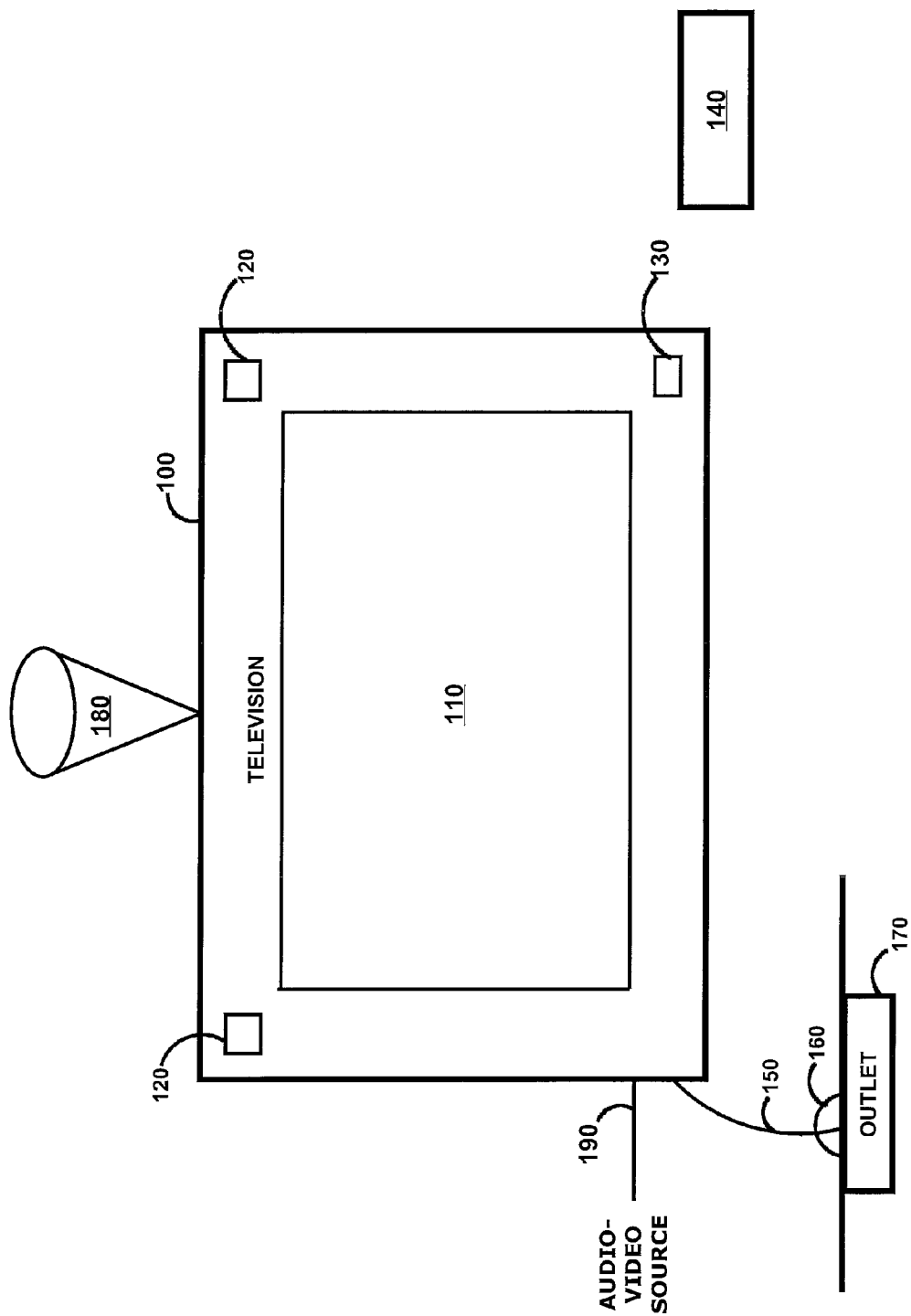
FIG. 1 illustrates a television.

Referring to FIG. 1, a television 100 includes a front facing display 110 which may be used to display video content. The television 100 may also include speakers 120 to provide an audio output. Also, the television 100 may include an on/off switch 130 and/or a remote control 140 permitting control over the television. The television 100 also includes a power cord 150 which includes a plug 160 at one end that is suitable to be plugged into an electrical outlet 170. The outlet typically receives its power from a power utility. When the television 100 is connected to the outlet 170 and power is being provided from the outlet 170 to the television, then the television 100 is capable of presenting images on the display 110. The audio-video content may be provided by an antenna 180 and/or from a source to a connector 190. The audio-video source may be, for example, a digital video player, a VHS player, a cable connection, an Internet connection, a memory card, or any other source.

Figure 2:
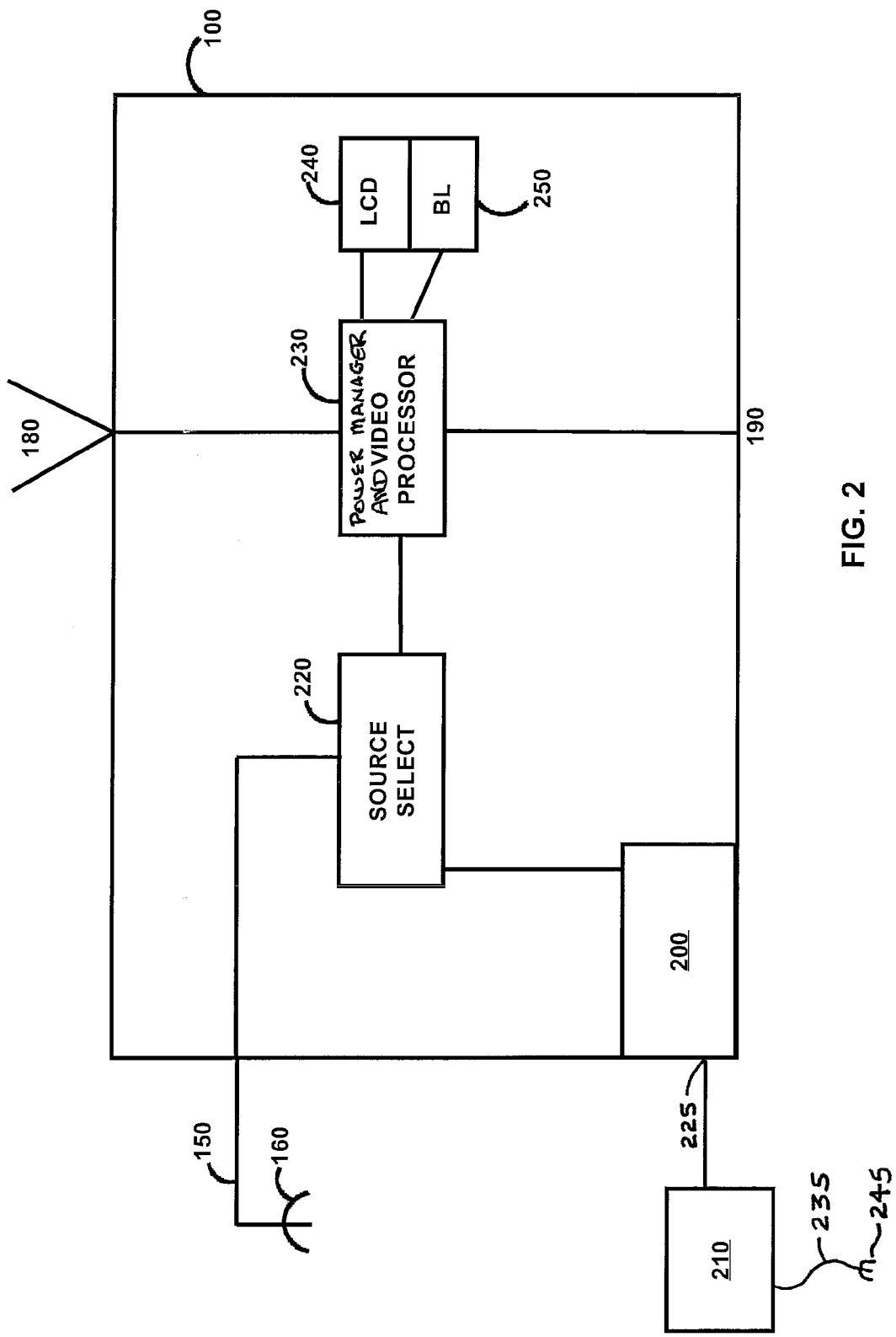
FIG. 2 illustrates the television of FIG. 1 with battery sources.

Referring also to FIG. 2, the television 100 may include an internal battery 200 which may be used as a power source for the presentation of images on the display 110 and providing the audio to the speakers 120. When power is not available from the outlet 170, then the television 100 may automatically switch to use the power from the battery 200 without the interruption in the presentation of images on the display 110. Similarly, when the television 100 is providing power to the display 110 by using the battery 200, and the power from the outlet 170 becomes available, then the power source may be switched from the battery 200 to the outlet 170 without the interruption in the presentation of images on the display 110. In addition, when the outlet 170 is providing power to the television 100, then the battery 200 within the television 100 is preferably being recharged independent of whether the television 100 is presenting images on the display 110. In this manner, the television may seamlessly switch between using the battery 200 and the outlet 170 as the power source without interruption of the presentation of images to the viewer. Moreover, during times of intermittent power outage the television will continue to present images on the display.

Televisions tend to be relatively light, small, and compact so the available capability for the battery 200 is limited. To increase the capability of the television to present images during extended power outages, beyond the capability of the internal battery 200, an inverter with external battery 210 may be used. The inverter with external battery 210 is interconnected to a separate plug interconnect 225 of the television specifically designed for the inverter with external battery 210. The inverter with external battery 210 may provide a DC voltage to the television 100, which is in turn, modified to provide an alternating current for the television, as necessary. The inverter 210, which includes an external battery, may provide an AC voltage to the television 100, which provides the power for the television. In this case the inverter with external battery 210 includes a power cord 235 which includes a plug 245 at one end that is suitable to be plugged into an electrical outlet. In this manner, the television may seamlessly switch between using the battery 200, the outlet 170, and the inverter with external battery 210, as desired, without interruption of the presentation of images to the viewer. For example, if the outlet power 170 is unavailable, then the television may switch to the inverter with external battery 210. If the inverter with external battery 210 is unavailable then the television may switch to the internal battery 200. In some cases, if the outlet power 170 is unavailable, the television may switch to the internal battery 200 independent of whether or not power is available from the inverter with external battery 210. Typically the inverter with external battery 210 has significantly larger storage capability than the internal battery 200, so that the television may operate for a longer duration during a power outage.

The television 100 may include a source selection 220 to select among the available power sources. The source selection 220 may also include suitable electronics for charging the battery 200 from available power. A power manager/video processor 230 receives power from the source select 220 and provides the power to the remainder of the television 100. Also, the power manager/video processor 230 processes the input video and provides suitable signals to the liquid crystal layer 240 and suitable signals to the backlight layer 250. In addition, the power manager/video processor 230 may modify the signals to the LCD layer 240 and/or the backlight layer 250 based upon the available power source and/or other settings.

Figure 3:
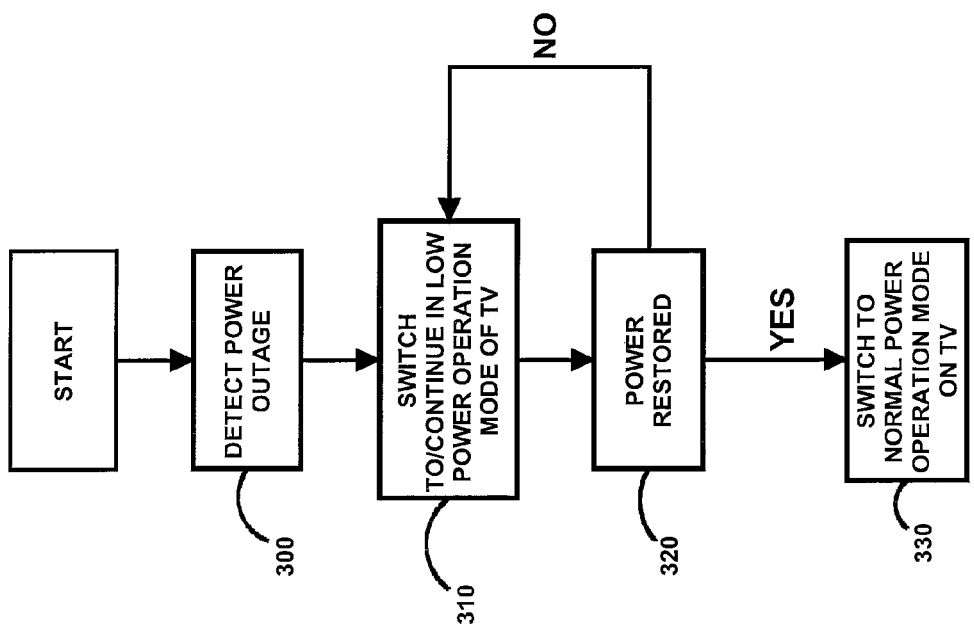
FIG. 3 illustrates power outage detection for the television of FIG. 1.

Referring to FIG. 3, during operation of the television 100, the power manager/video processor 230 may determine when there is a power outage 300 from the outlet 170 (e.g., no available power) and/or the inverter with external battery 210 (e.g., reduced available power). When there is a power outage 300, such as no power from the outlet 170 then the system may switch 310 to use the inverter with external battery 210. When the power outage 300, such as no power from the outlet 170 and no power from the inverter with external battery 210, then the system may switch 310 to use the internal battery 200. In either case, the power manager/video processor 230 may automatically modify 310 the display of the video content in a manner to conserve the available power. When power 320 is restored, the system switches 330 back to the normal power operation mode.

Figure 4:
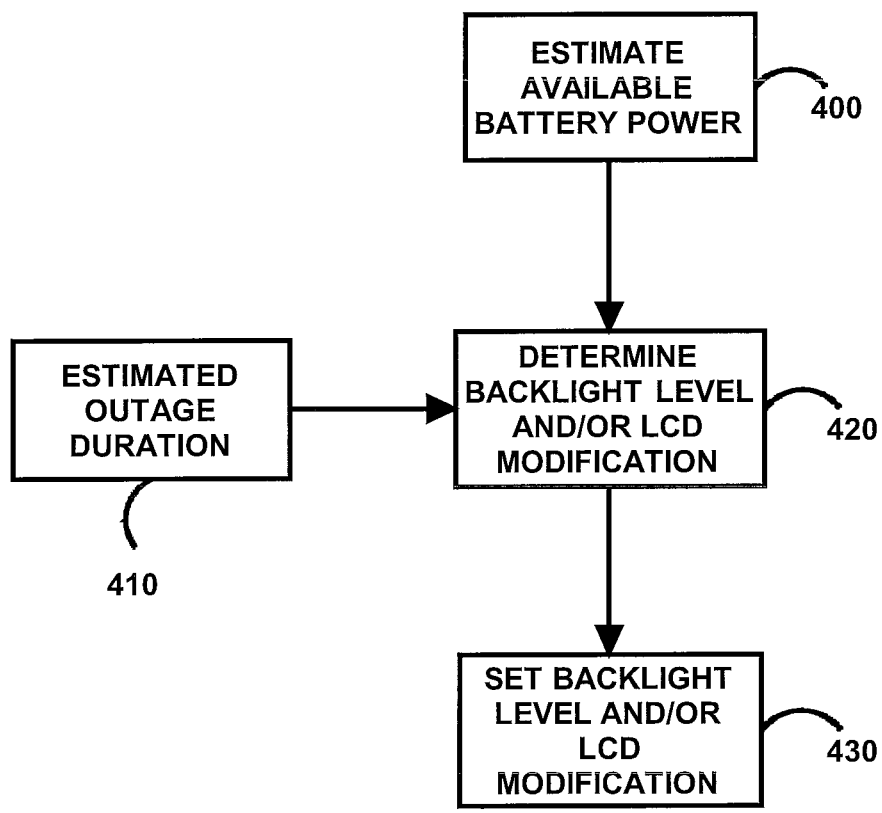
FIG. 4 illustrates power management for the television of FIG. 1.

Referring to FIG. 4, during operation of the television 100, when the switch to a lower power mode 310 is selected the power manager/video processor 230 may estimate the available battery power. The available battery power may be based upon an estimate of the typical power available in the internal battery 200 and/or the inverter with external battery 210. The available battery power may be further based upon the charge level of the internal battery 200 and/or the inverter with external battery 210. The available battery power may also be based upon a query from the power manager/video processor 230 to the battery 200/210 which returns a signal indicative of the available power. The available battery power may be further based upon knowledge of other load (e.g. light bulbs, fans etc.) served by the inverter with external battery 210. The system also estimates the outage duration 410. The outage duration may be based upon a history of outages in the past, may be based upon an anticipated/scheduled outage duration, may be based upon a desirable time duration over which particular video content is desirable to be viewed such as a cricket match or a soccer match, and/or may be based upon a user selectable setting. Based upon the estimate outage duration 410 and the available battery power 400 the power manager/video processor 230 determines suitable values for the liquid crystal layer 240 and suitable power to be provided to the backlight layer 250. For example, one way of conserving power usage is to reduce the backlight level. For example, another way of conserving power usage is to reduce portions of the backlight while not reducing other portions of the backlight. For example, one way of conserving power usage is to increase the overall transmission of the liquid crystal layer. For example, another way of conserving power usage is to reduce the backlight power usage while simultaneously increasing the transmission of the liquid crystal layer. For example, another way of conserving power usage is modifying the media playback on the TV to decode only some of the video frames instead of all the video frames and to playback the reduced frame rate video. For example, yet another way of conserving the power is only reproducing some (e.g. mono/ stereo) of the audio channels of the multiple audio channels (e.g. 5.1 audio) for the current video program. Any suitable power reduction technique may be used, as desired. The backlight level and/or the liquid crystal layer is modified 430, as desired.

Figure 5:
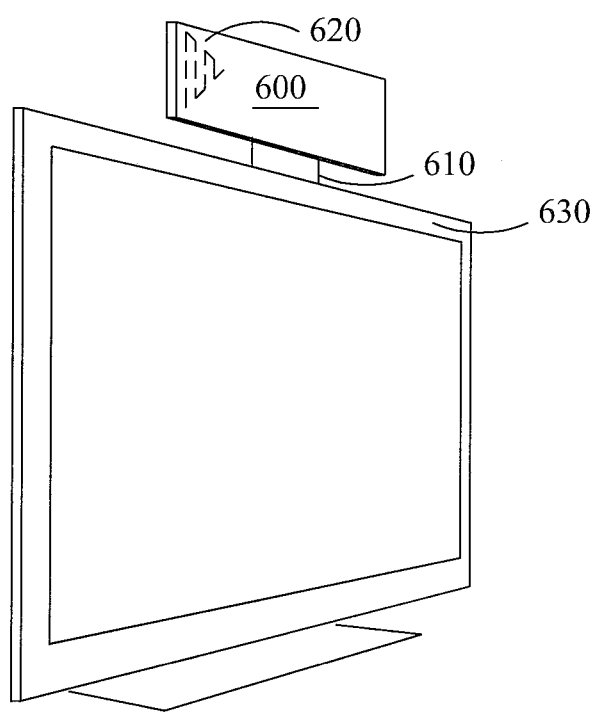
FIG. 5 illustrates a television with an integrated solar panel.

Referring to FIG. 5, an additional technique to provide power to the television and/or recharge the internal battery 200 and/or inverter with external battery 210, is to include an integrated solar panel 600. Preferably the solar panel 600 includes a hinge 610 so that the solar panel may be rotated to a location more suitable for receiving solar and/or ambient light. In addition, the hinge 610 preferably permits the solar panel to be rotated back out of the way to a position substantially flat with respect to the back and/or front of the display. The solar panel 600 may also include an antenna 620 on the back surface thereof or any other suitable location. In this manner, the traditional antenna for the television may be omitted while being integrated together with the solar panel 600. Further the hinge 610 may include an integrated motor so that the solar panel 600 may track or otherwise adjust itself to position more suitable for the receipt of available light.

The power manager/video processor 230 may use the power available from the solar panel 600 as a basis to determine its power management modifications. For example, in this manner the television may display video content for a longer duration that it would have otherwise, or may display higher quality video content for the same duration. The front surface of the television around the liquid crystal display area may include a solar panel 630. In this manner, the front surface of the display will be suitable to provide power for the television. Further, a surface of the remote 140 (see FIG. 1) may include a solar panel so that the batteries in the remote control may be recharged, or otherwise provide sufficient power for the operation of the remote control.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A display device including power management comprising:
   (a) said display device including a first input suitable to receive electrical power from an outlet for providing power for the operation of said display device;
   (b) said display device including a second input suitable to receive electrical power from an external battery source for providing power for the operation of said display device, where said first input to said display device and said second input to said display device are spaced apart from one another, and interconnected such that said external battery source may be recharged when said first input receives power from said outlet;
   (c) said display device including an internal battery source enclosed within said display device suitable for providing power for the operation of said display device;
   (d) a source select enclosed within said display device that selects power from at least one of said first input, said second input, and said internal battery for providing power for the operation of said display device;
   (e) a processor that receives video content from a video source and selectively modifies a backlight of said display device based upon the power source selected by said source select in such a manner as to reduce the power consumption of said display device;
   (f) wherein said backlight is modified based upon a signal from said external battery source provided to said second input, apart from said electrical power from said external battery source, wherein said signal provides an estimate of the available battery power charge level of said external battery source.

2. The display device of claim 1 wherein said outlet receives power from a utility.

3. The display device of claim 1 wherein said display device includes an attached power cord interconnecting said display device to said outlet.

4. The display device of claim 1 wherein said external battery source includes an inverter.

5. The display device of claim 4 wherein inverted power from said external battery source is provided to said second input.

6. The display device of claim 1 wherein said internal battery source is rechargeable.

7. The display device of claim 6 wherein power from said first input is capable of being used to recharge said internal battery source.

8. The display device of claim 6 wherein power from said second input is capable of being used to recharge said internal battery source.

9. The display device of claim 1 wherein said source select selects power from said first input if power is available from said first input to the exclusion of said second input and said internal battery.

10. The display device of claim 1 wherein said source selects power from said second input if power is available from said second input and power is not available from said first input and to the exclusion of said internal battery.

11. The display device of claim 1 wherein said source selects power from said internal battery if power is available from said internal battery and power is not available from said first input and said second input.

12. The display device of claim 1 wherein said source selects power from said internal battery if power is available from said internal battery and power Is not available from said first input and independent of whether power is available from said second input.

13. The display device of claim 1 wherein said processor receives said video content from an antenna.

14. The display device of claim 1 wherein said processor receives said video content from a digital video source.

15. The display device of claim 1 wherein said processor decodes only a selected subset of available video frames.

16. The display device of claim 1 wherein said processor only provides audio to a selected subset of available audio channels.

17. The display device of claim 1 further including a solar panel.

18. The display device of claim 17 wherein said solar panel is movably engaged with said display device.

19. The display device of claim 18 wherein said solar panel is movable to a position substantially flat with respect to at least one of the back and the front of the display.

20. The display device of claim 17 wherein said solar panel include an antenna for said display device.

21. The display device of claim 17 wherein said solar panel is movably engaged using a motor with said display device.

22. The display device of claim 17 wherein said solar panel is integrated on the front of said display device.

23. The display device of claim 17 wherein energy from said solar panel is used as a basis of said processor to said reduce said power consumption of said display device.

* * * * *